Oct. 7, 1930.  F. E. WOLD ET AL  1,777,632
DEVICE FOR APPLYING LININGS
Filed July 18, 1928   3 Sheets-Sheet 1
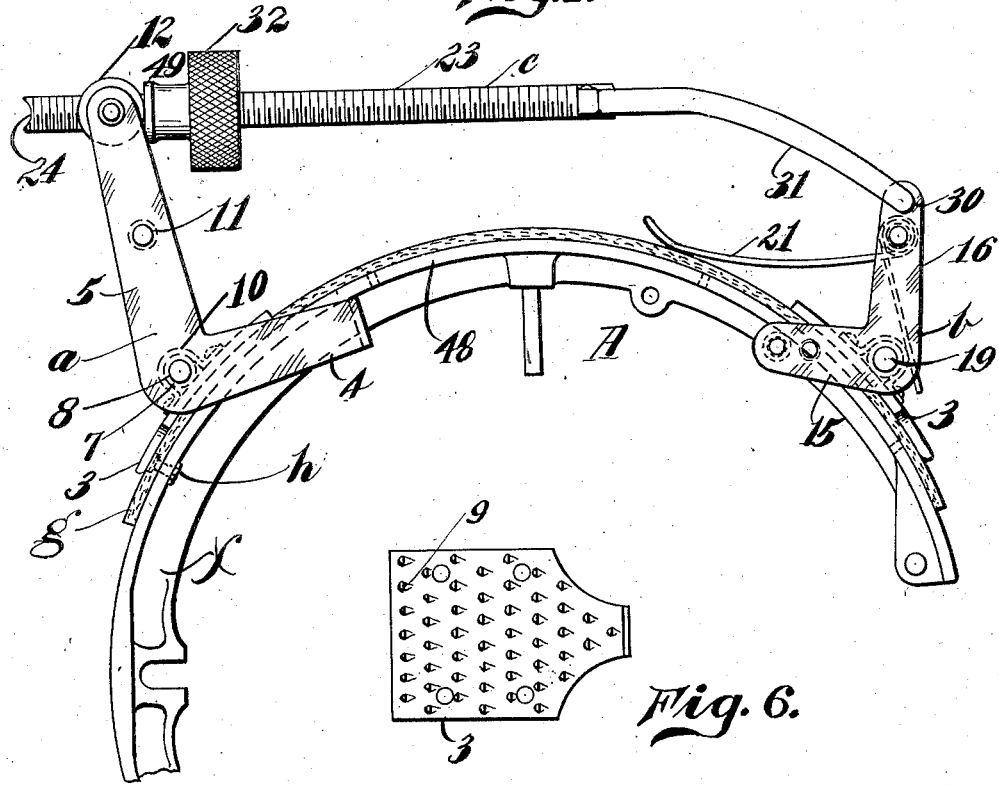
Inventors.
Frank E. Wold,
and John G. Whalen,
By Blakeslee & Brown
Attorneys

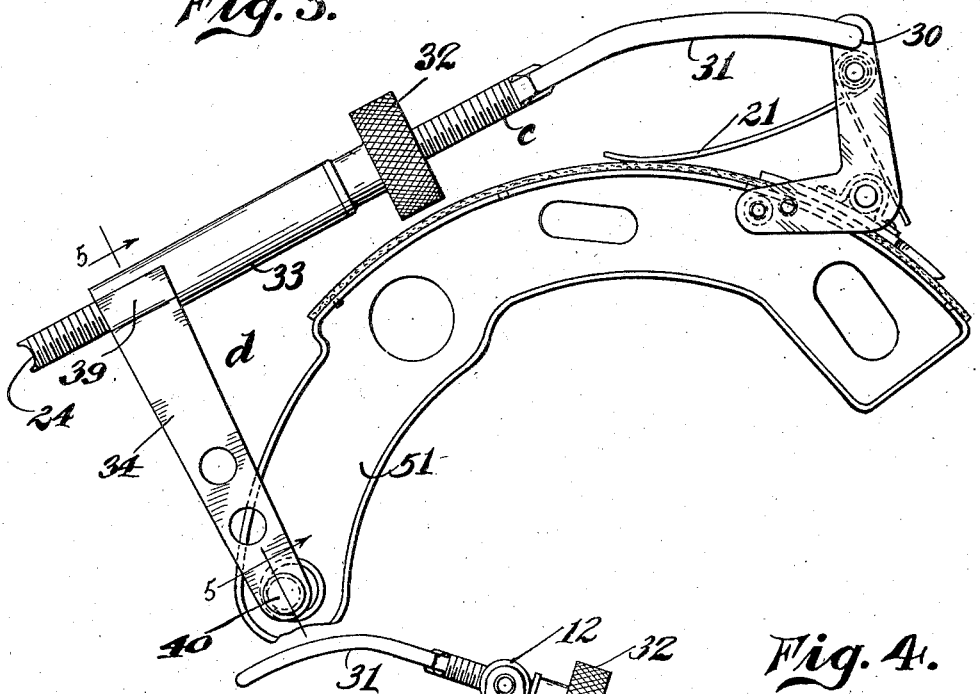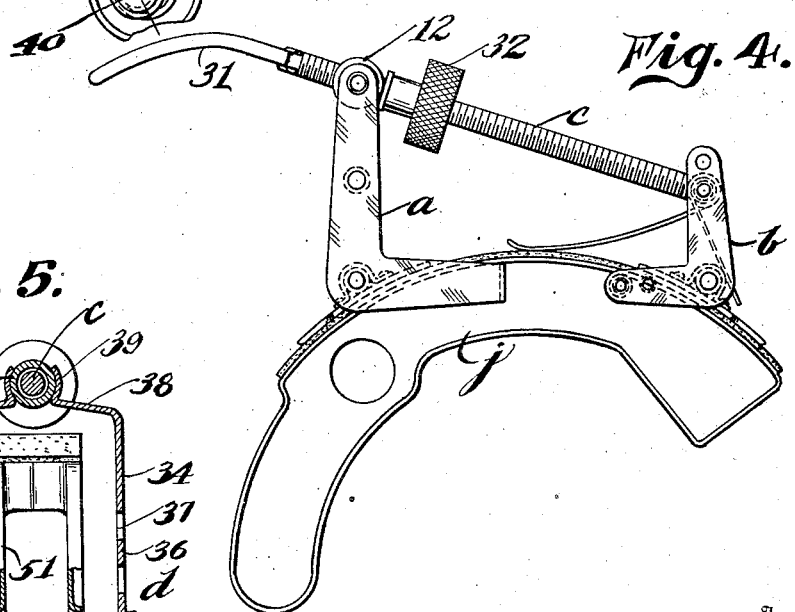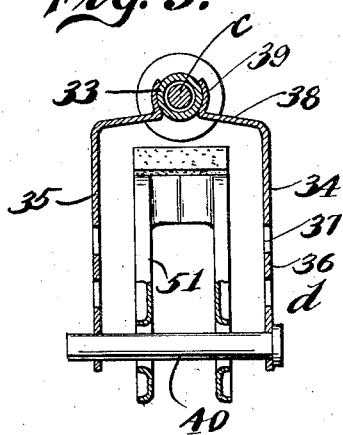

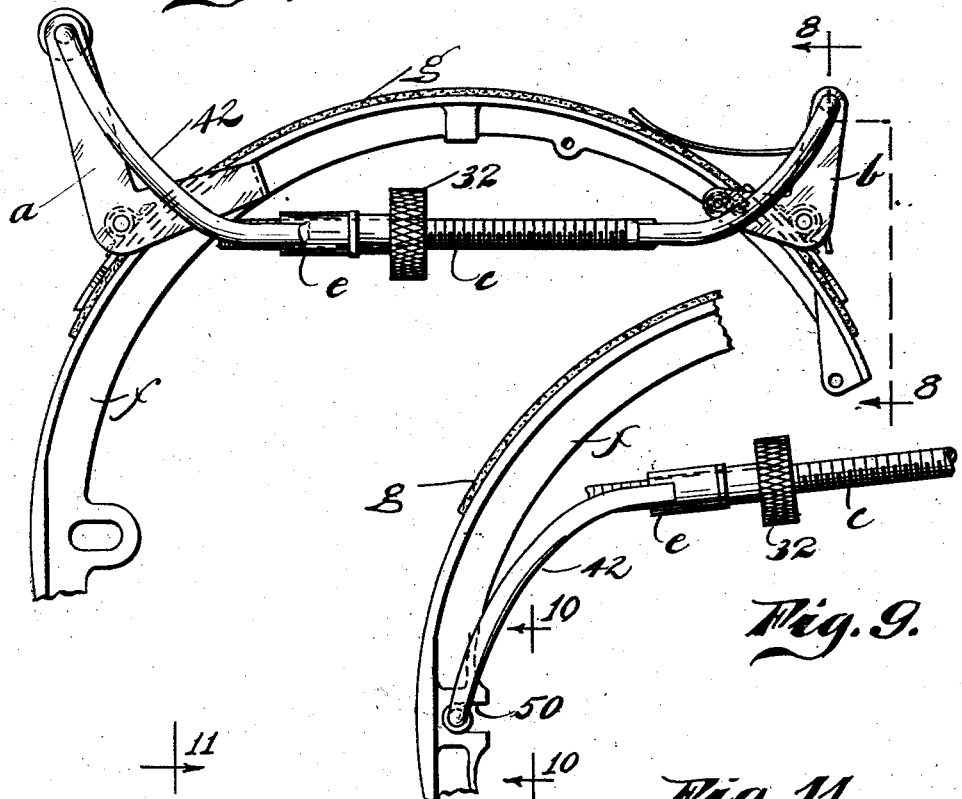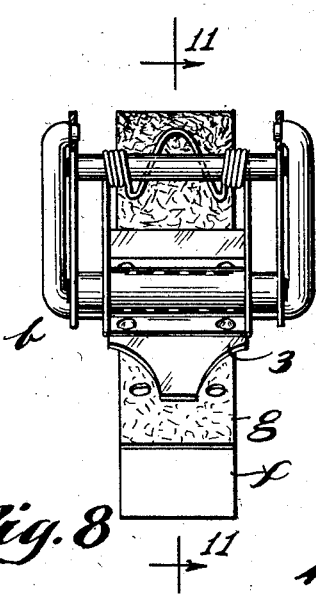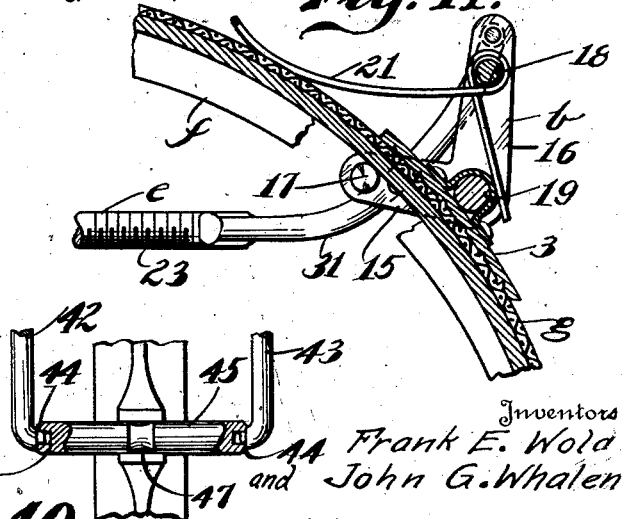

Patented Oct. 7, 1930

1,777,632

UNITED STATES PATENT OFFICE

FRANK E. WOLD AND JOHN G. WHALEN, OF SANTA MONICA, CALIFORNIA; SAID WHALEN ASSIGNOR TO SAID WOLD

DEVICE FOR APPLYING LININGS

Application filed July 18, 1928. Serial No. 293,699.

This invention relates to means adapted to tension linings on brake shoes and the like.

The invention has for an object the provision of a device which is so constructed and arranged as to be capable of many uses in many different positions.

More particularly the invention has for an object a device which is adapted to effectively and efficiently stretch linings on brake shoes and regardless of the construction of the brake shoe. Brake shoes differ as to construction and it is sometimes very difficult to apply brake linings thereto. The ordinary method is to tack or otherwise secure by rivets or the like one end of the brake lining and then attempt to stretch by hand the brake lining upon the shoe and then further secure the lining. This method is unsatisfactory for many reasons, one of which is that use of the brake causes the brake lining to creep, resulting in uneven wear of the brake lining. At the present time most brakes incorporate a brake shoe which is cast and given a certain curvature. A lining which is carefully applied to this brake shoe will assure that the brakes do not drag and still permit a very slight spacing from the drum of the brake. Brake shoes differ as to form and a primary object of this invention is to provide a device which will efficiently and quickly permit the application of a brake lining to any existing type of shoe. The inventors are aware that various methods have been resorted to, to stretch brake linings upon brake shoes but so far as the inventors are aware, no prior device will permit lining to be universally applied to different forms of brake shoes.

The invention further contemplates the novel and useful provision, formation, construction, association and relative arrangement of parts, members and features, all as shown in certain embodiments in the accompanying drawings described generally and more particularly pointed out in the claims.

In the drawings

Figure 1 is a side elevation of the invention shown in position of service,

Figure 2 is a plan view of the invention shown in Figure 1,

Figure 3 is a modified form of the invention,

Figure 4 is a view similar to Figure 1 and showing the invention in position of service, Figure 5 is a cross sectional view on the line 5—5 of Figure 3, Figure 6 is a plan view of one of the grips or shoe members used in practicing the invention, Figure 7 is a side elevation of a modified form of the invention, certain parts being in changed relation, Figure 8 is a cross sectional view on the line 8—8 of Figure 7, Figure 9 is a fragmentary view showing a modified method whereby the invention may engage work, Figure 10 is a view looking in the direction of line 10—10 of Figure 9, and Figure 11 is a cross sectional view on the line 11—11 of Figure 8.

Referring now with particularity to the drawings, the improved invention is designated as an entirety by A, and the same includes work engaging means $a$ and $b$, and means $c$ for positively moving the means $a$ and $b$. The means $a$ comprises a pair of members 1 and 2 spaced apart and carrying therebetween a swing grip or shoe 3. The members 1 and 2 are identically formed and both include a pair of arms 4 and 5 which are angularly related, the arm 4 being formed with an inturned end 6 substantially at right angles to the arm 4. At the zone included between the arms 4 and 5 and designated as 7, we have provided a perforation or transverse bore 8. Adapted to be received in said bores are ends of a pintle or shaft whereby the grip or shoe 3 may be swingingly mounted thereon. In particular the said shoe is arcuate in form and provided with a series of serrations 9 with said shoe carrying on the back thereof a knuckle member 10 through which the pintle is passed. Considering the members 1 and 2, they are in turn held in working relation by means of a cross bar extending between the arms 5, as shown at 11. The outer extremities of the arms 5 carry therebetween a roller 12, the roller being formed with a transverse bore.

The shoe or grip $b$ includes a pair of spaced substantially parallel side members 13 and 14, each provided with a pair of arms 15 and 16 at substantially right angles the same as for the arms 4 and 5 of the means $a$ and the arms 15 carry adjacent their outer extremities inwardly directed studs 17. These studs are provided with ends of reduced diameter which are threaded to be received in a threaded opening of said arms 15. A rod 18 transversely extends between the arms 16. As before, the means $b$ likewise is provided with a swing shoe or grip 3. A pintle 19 extends between the members 13 and 14 for securing the knuckles of the shoe or grip 3 to the end that said shoe or grip may swing between said members 13 and 14. A wire spring is adapted to be secured to the means $b$, the same including a wire which has one end bearing against the knuckle, then coiled about the rod 18 as shown at 20, then extended outwardly in substantially a U-shaped portion 21, whereupon it is again coiled about the rod 18 as shown at 22, said coils being spaced apart with the end finally terminating so as to engage the knuckle. This construction provides what may be termed a spring-pressed tongue considering the U-shaped portion.

The means $c$ includes a screw-threaded rod or shaft 23 provided at one end with a concavity 24 and the opposite end carrying a forked or bifurcated member 25. The furcations are designated as 26 and 27 with both furcations provided with inturned portions 28, the inturned portions 28 being reduced in diameter at 29 so as to fit within openings of the arms 16, as shown at 30. This bifurcated member has the furcations thereof curved, as shown at 31. A hand adjusting nut 32 is threaded upon the screw-threaded rod 23.

Certain attachments may be utilized with the device just described and prior to discussing the operation, uses and advantages, such attachments will be described.

One of said attachments is shown in Figures 3 and 5 and designated as $d$, the same including a sleeve 33 to which is secured a pair of leg members 34 and 35. These leg members are identically constructed and one thereof will be described. The leg 34 includes an elongated part 36 provided with one or more transverse openings 37 and a part 38 which extends at an angle to the elongated part, finally terminating in an end at an angle to the part 38 with said end curved as shown at 39 so as to conform to the curvature of the sleeve 33. This curved portion 39 would be secured to the sleeve by welding or pinning, or in any other approved manner. The legs are adapted to have a bolt or the like 40 extend therebetween by being passed through certain of the openings 37, which openings would be in alignment in both said legs.

In Figures 7, 9 and 10, we have provided an attachment member $e$, the same including a sleeve 41 provided with a pair of curved, spaced apart arms 42 and 43, which arms have inwardly directed end portions in part reduced as to diameter, as shown at 44. The attachment member $e$ is similar to the bifurcated end of the means $c$. The arms 42 and 43 may transversely carry in certain embodiments of the invention a rod 45, as shown in Figure 10, which rod 45 would be provided with socket ends 46 adapted to receive the ends of reduced diameter 44 of the arms 42 and 43. Furthermore, said rod is circumferentially grooved intermediate its ends, as shown at 47.

The operation, uses and advantages of the invention just described are as follows:

As before stated, it is customary in present automobile practice to provide a brake shoe which is more or less permanent as to form as counter-distinguished from that form of shoe which consists of a thin spring band adapted to carry a brake lining, the reason being that the thin band is liable to deformation. We mention this to begin with not with the idea of limiting our invention but rather as pointing out a use of the present invention, although our said device will operate as well on the spring band as upon the form shown in the drawings. In Figure 1, we have shown a brake shoe of the cast type which is permanent as to form and designated as $f$. A brake lining of some form $g$ is to be applied to said shoe. The first operation would be to tack or secure one end of said lining in the usual manner, which is to say, a soft rivet of some form $h$ is passed through said brake lining and through a prepared opening in the shoe $f$. The device A is next applied substantially as shown in Figures 1 and 2. The adjusting nut 32 is secured inwardly of the shaft, and the means $a$ is placed in position so that the inwardly directed ends 6 of the arms 4 will rest beneath the flanged portion 48 of the shoe. The grip or shoe 3 will have its serrated portion upon the brake lining. The means $b$ will likewise be positioned so that the spring tongue 21 will bear against the surface of the brake lining with the said shoe likewise engaging said lining. The adjusting nut 32 is then turned in such a manner as to cause the shank 49 thereof to have its end abut against the roller 12. As a result, the means $a$ and $b$ will be forced apart. In this regard, it will be observed that the stud 17 is engaged beneath the flange of the brake shoe and the pressure against the outer ends of the arms 16 of the means $b$ and the arms 5 of the means $a$ will tend to rotate such arms and force the shoes into tight engagement with the brake lining due to the fact that the studs 17 of the means $b$ and the ends 6 of the means $a$ hold said members $a$ and $b$ against rotation. It is thus possible to tightly stretch the lining upon the shoe and when so stretched the rivets may be applied as between the lining and the shoe. In this regard, an inspection of Figure 2 will show that the screw-threaded shaft takes up little space and the operator has plenty of room in which to apply the rivets. The rivets may be applied by hand or by machine, inasmuch as the device A will not in any manner interfere with the application of said rivets.

In Figure 1, it will be observed that the shoe for the means a overlies the tacked end of the brake lining. This is in order that this end of the lining should not move. As a result, the opposite means b will move and pull the lining relative to the shoe 3 of the means a.

It is not always possible to apply a lining to the shoe by having the means c straddling the top of the lining and when it is impossible to so apply a lining, the method shown in Figure 7 may be resorted to. In this connection, it is possible to snap the ends of the bifurcated member 25 from the end openings of the arms 16 of the means b, and reverse the position and again snap said ends into said openings in the manner illustrated in Figure 7. The furcated ends would then straddle the brake shoe. The means e would then have the sleeve thereof slipped upon the shaft 23 with the inturned ends received within openings at the end of the arms 5 of the means a. Assuming the grips or shoes in position against the lining, a turning of the adjusting nut 32 would force the sleeve 41 outwardly relative to the shaft and cause relative separation between the means a and b.

It is possible to operate the means b to stretch the lining relative to the shoe without the means a and in the manner shown in Figures 9 and 10. In this case, the attachment device e would be utilized in substantially the arrangement shown in Figure 7 with the exception that said attachment e would carry the rod 45, as shown in Figure 10, with said rod received in a channel portion 50 of the brake shoe f. Thus, a turning of the adjusting nut 32 will cause movement of the means b.

In Figure 4, we have shown a short length brake shoe j. In order to fasten brake lining thereon, we may take the device as shown in Figure 1 and detach the bifurcated end of the means c from the openings in the means b. The shaft is then reversed so that the curved groove 24 thereof will bear against the rod 18 with the bifurcated end extending outwardly. It is to be remembered, of course, that the shaft is passed through the transverse bore in the roller 12. The operation of separating the means a and b would remain the same.

In Figures 3 and 5, we have shown a modification of the device utilizing the attachment member d. This is utilized when a small brake shoe is used, the webbing 51 of said shoe being provided with one or more transverse openings. The legs 34 and 35 would carry the rod 40 which is passed through certain of the transverse openings 37 in said legs, said rods likewise being passed through certain of the openings in the webbing 51. The means b would be utilized along with the screw-threaded shaft and the bifurcated ends and the adjusting nut 32 would bear against the end of the sleeve 33. Relative movement between the attachment and the means b would occur when the adjusting nut was turned.

We have provided a device for applying brake linings to brake shoes which is universal in its adaptation. It can be operated in many manners with the parts reversible and interchangeable. The screw-threaded shaft with its forked or bifurcated end may be reversed as to position to perform different functions and shoes that would be otherwise difficult to handle from the standpoint of brake lining efficiency may have brake linings applied in an easy and rapid manner. Brake linings applied with our invention are applied under tension and a brake lining is not liable to in any manner warp or have blistered portions when applied under tension.

It is obvious that various changes and modifications and variations may be made in practicing the invention in departure from the particular showing of the drawings without departing from the true spirit thereof.

We claim:

1. A device for applying brake lining to a flanged brake shoe, comprising a pair of members both provided with arms for engagement with said flange of the brake shoe, lining engaging means carried by said arms, and means between both said members for causing relative movement therebetween.

2. A device for applying brake lining to a brake shoe, comprising a pair of members both including a pair of spaced arms, and grips swingingly mounted therebetween; means on said arms for engagement with said brake shoe, said grips being adapted for engagement with the said lining, and means for causing relative movement between said arms.

3. In a device of the character disclosed, a pair of members both comprising a pair of spaced arms having angularly related parts and swing grips between said arms, a roller between one pair of arms of one of said members, a screw-threaded shaft provided with a bifurcated extremity having the shaft portion passed through said roller, said bifurcated extremity being adapted for engagement with the arms of the other of said pair of members, and means on said shaft and abutting against said roller for causing relative movement between said pair of members.

4. A device for applying brake lining to a brake shoe, comprising a pair of members both including a pair of spaced arms, and grips swingingly mounted therebetween; means on said arms for engagement with said brake shoe, said grips being adapted for engagement with said lining, a screw-threaded shaft secured to one of said arms and movable relative to the other arm, and means on said shaft and abutting against said last named arm whereby relative movement may be obtained between said arms.

5. A device for applying brake lining to a brake shoe, including a pair of members both comprising a pair of spaced arms, means on said arms for engagement with said brake shoe, means swingingly mounted between each pair of the spaced arms for engagement with the lining, and means for causing relative movement between said pairs of arms to stretch the brake lining upon the shoe.

6. A device for applying brake lining to a flanged brake shoe, including a pair of members both provided with a pair of spaced arms, said arms being adapted to engage the flange of said brake shoe; means, for gripping the brake lining, swingingly carried between the arms; and adjustable means extending between the pair of members for causing relative movement therebetween.

In testimony whereof, we have signed our names to this specification at Santa Monica, California, this 10th day of July, 1928.

FRANK E. WOLD.
JOHN G. WHALEN.